Nov. 27, 1934.　　O. V. STRAND　　1,982,083

FISH SCALING DEVICE

Filed Aug. 3, 1931

INVENTOR
Oscar V. Strand
BY Fred Gerlach
his ATTY.

Patented Nov. 27, 1934

1,982,083

UNITED STATES PATENT OFFICE 1,982,083

FISH SCALING DEVICE

Oscar V. Strand, Evanston, Ill.

Application August 3, 1931, Serial No. 554,721

1 Claim. (Cl. 17—5)

The present invention relates generally to devices for scaling fish. More particularly the invention relates to that type of fish scaling device which is designed to be manually manipulated and comprises a tubular handle, a shaft which extends longitudinally through and is journaled in a bushing in the handle and is adapted to be driven from an electric motor or like source of power by means of a flexible shaft, and a cylindrical rotor which is secured fixedly to one end of the shaft for drive about its own axis and embodies radially extending teeth or projections on its periphery for effecting scaling of the fish upon drive of the shaft by the motor.

One object of the invention is to provide a fish scaling device of this type in which the rotor is housed in a tubular casing which is secured at one end to the handle and has a rectangular side opening through which projects a small portion of the rotor so that the teeth of the rotor may be brought into engagement with the fish during a scaling operation.

Another object of the invention is to provide a fish scaling device of the last mentioned character in which the casing is of novel construction and embodies an arcuate plate or member which fits against the inner periphery thereof and is adjustable circumferentially of the casing so as to regulate the width of the side opening and thus determine the extent of projection of the aforesaid portion of the rotor.

A further object of the invention is to provide a fish scaling device which is of new and improved construction and is extremely efficient in operation.

Other objects of the invention and the various advantages and characteristics of the present fish scaling device will be apparent from a consideration of the following detailed description.

The invention consists in the several novel features which are hereinafter set forth and are more particularly defined by the claim at the conclusion hereof.

In the drawing which accompanies and forms a part of this specification or disclosure and in which like numerals of reference denote corresponding parts throughout the several views.

Figure 1:
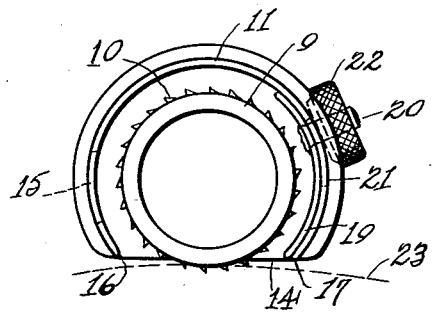
Fig. 1 is an end view of a fish scaling device embodying the invention.

Although I have illustrated the invention as embodied in a portable device particularly adapted for scaling fish, it is to be understood that this is for the purpose of disclosing the invention and is not intended to limit the invention to the specific construction shown. It is contemplated that various changes may be made by those skilled in the art without departing from the spirit and scope of the invention as pointed out in the appended claim.

The fish scaling device which forms the subject matter of the invention comprises a tubular handle 5 having a hollow bushing 6 positioned therein. A rotatably mounted drive shaft 7 extends through the bushing 6 and a packing nut 8 screw threaded thereon, and carries a rotor 9. As shown in the drawing this rotor consists of a cylindrical body and is provided with a plurality of teeth 10 suitable for scaling fish. The rotor is adapted to be driven by a power driven flexible shaft (not shown) which may be suitably coupled to the right-hand end of the shaft 7, thereby permitting the device to be manipulated by an operator grasping the handle 5.

In order to protect the operator, the device is provided with a tubular casing 11 which is secured to the handle by means of a collar 12 which surrounds the nut 8 and is fastened thereto by a set screw 13. As illustrated most clearly in Figs. 1 and 3 of the drawing, this casing is provided with a pair of peripherally spaced longitudinally extending slots 14 and 15. The slot 14 is sufficiently wide to permit the rotor 9 to extend therethrough, as shown in Fig. 1, for operative engagement with the fish which is to be scaled. It will be noted that the portions 16 and 17 of the casing forming the side edges of the slot act as guides to limit the depth of the cut, and thereby prevent the tool from gouging into the fish. The slot 15 is preferably provided as a discharge opening for the casing to supplement the discharge opening formed by the open end at 18.

Figure 2:
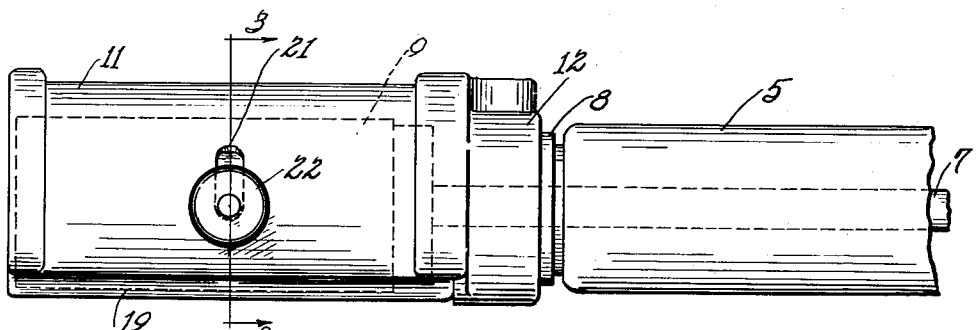
Fig. 2 is a fragmentary side elevation.
Figure 4:
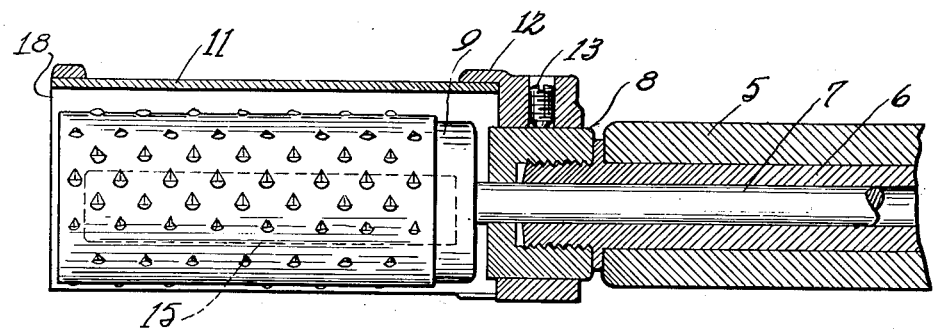
Fig. 4 is a section approximately along the line 4—4 of Fig. 3.

In order to vary the depth of cut of the teeth-equipped rotor 9, means is provided for adjusting the width of the slot 14. As illustrated herein, this means comprises a rectangular member 19, arcuate in form and positioned against the inner wall of the casing 11 on the side opposite from the slot 15. This member extends substantially throughout the length of the casing 11, as shown in Fig. 2, and is adjustable from the position shown in Fig. 1 to that shown in Fig. 3. For securing the member 19 in its adjusted position, a screw threaded device 20 is fastened thereto and extends through a slot 21 in the casing so as to be engaged by a thumb nut 22.

Figure 3:
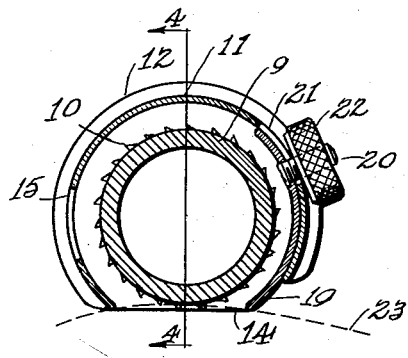
Fig. 3 is a section approximately along the line 3—3 of Fig. 2.

It will be readily apparent that by adjusting the arcuate member 19 peripherally of the casing 11, the width of the slot 14 may be varied, and that by so doing the extent to which the rotor 9 projects through the slot may be adjusted. Thus, with the member 19 as illustrated in Fig. 3, the rotor is arranged to take a relatively thin scaling cut on a fish illustrated by the curved line of dashes 23, whereas, with the member adjusted as illustrated in Fig. 1, a relatively deep scaling cut would be taken. By providing this adjustable means for determining the depth of the cut, uniform operation of the rotor is secured and the operator is permitted to work more rapidly than he could if the depth of the cut depended upon the pressure with which he applied the tool.

Having thus described the invention, what I claim as new and desire to secure by Letters Patent, is:

As a new article of manufacture, a portable fish scaling device comprising a hollow handle having a packing nut at one end thereof, a shaft extending through the handle and having one end thereof projecting beyond said nut and its other end adapted for connection to a source of power for driving purposes, a rotor secured removably to said one end of the shaft for rotation with the shaft and comprising a cylindrical body having a plurality of fish scaling teeth extending outwardly therefrom, a tubular casing surrounding said rotor throughout its entire length and having a collar at its inner end whereby it is secured to the nut and having its other end open to permit axial removal of the rotor, said casing having a longitudinally extending straight sided opening in one side thereof through which the body of the rotor projects and also having a rectangular discharge slot at one side of the opening and a circumferential slot at the other side of said opening, an arcuate member engaging the inner periphery of the casing at said other side of the opening and having a substantially straight side margin parallel to and extending substantially through the length of said opening, said member being rotatable relatively to the casing so as to permit of an adjustment in the size of the opening through which the rotor projects and thus to effect variation of the depth of the cut of the rotor, and means for adjustably securing the member in its various assigned or adjusted positions comprising a screw fixedly secured to the member and projecting outwardly through said circumferential slot in the casing and a thumb nut on the outer end of the screw for clamping the member against the inner periphery of the casing.

OSCAR V. STRAND.